United States Patent [19]

Sakuhara et al.

[11] Patent Number: 4,837,435
[45] Date of Patent: Jun. 6, 1989

[54] TUNNELING SCANNING MICROSCOPE HAVING LIGHT SOURCE

[75] Inventors: Toshihiko Sakuhara; Fumiki Sakai; Tetsuo Uchiyama, all of Tokyo, Japan

[73] Assignee: Seiko Instruments Inc., Tokyo, Japan

[21] Appl. No.: 210,810

[22] Filed: Jun. 24, 1988

[30] Foreign Application Priority Data

Jun. 25, 1987 [JP] Japan .................................. 62-158571

[51] Int. Cl.[4] .............................................. H01J 37/26
[52] U.S. Cl. ...................................... 250/306; 250/307
[58] Field of Search .................................. 250/306, 307

[56] References Cited

U.S. PATENT DOCUMENTS 4,343,993 8/1982 Binnig et al. ........................ 250/306
4,724,318 2/1988 Binnig .................................. 250/306

Primary Examiner—Jack I. Berman
Attorney, Agent, or Firm—Bruce L. Adams; Van C. Wilks

[57] ABSTRACT

The tunneling scanning microscope which is provided with a light source to irradiate a sample with light, particularly with light having one wavelength. The apparatus is used for the investigation of the surface structure of materials which have very low conductivity but increase their conductivities under light irradiation. In particular, the apparatus selectively provides an atomic image of an element of a compound in response to a selected wavelength.

2 Claims, 3 Drawing Sheets

TUNNELING SCANNING MICROSCOPE HAVING LIGHT SOURCE

BACKGROUND OF THE INVENTION 1. (Field of industrial utility)

The present invention relates to a tunneling scanning microscope, particularly to a tunneling scanning microscope which is capable of investigating the surface structure of a material of low electrical conductivity including inorganic compounds, photoconductive organic materials, etc.

2. (Prior arts)

A scanning tunneling microscope is well known in, for example, U.S. Pat. No. 4,343,993. The scanning tunneling microscope is an apparatus with which the surface structure of conductive materials such as metals can be observed in the order of the magnitude of an atom. When a voltage is applied between a conductive material and a conductive tip and they are closely brought together to approx. 1 nm apart, tunneling currents flow therebetween. The tunneling currents change sensitively in response to extremely fine distance changes thereby enabling the observation of the surface structure in the order of the magnitude of an atom. In a tunneling scanning microscope, changes of the tunneling current in response to the change of distances between the conductive tip and the surface of the conductive material have to be large in order to produce a high resolution image of the surface structure of the conductive material. Since higher conductivity of a sample material means higher sensitivity and higher resolution, materials of low conductivity including organic compounds, photoconductive organic materials, inorganic compounds, etc., result in poor resolution or difficulty in surface investigation. Therefore the range of materials applicable to the observation by tunneling scanning microscopes is limited. For example, the surface investigation of organic materials, most of which are of low conductivity, represents such difficulties. Conventionally, the surface image of an organic material is obtained through observing a metal layer which is deposited on the organic materials by evaporation or sputtering. In this case, however, there is a possibility of changes of the surface structure of the organic material during deposition of metal thereon, and therefore investigation without metal deposition has been desired.

SUMMARY OF THE INVENTION

It is well known that some types of materials increase their conductivities under light irradiation. There are many such types of materials in the abovementioned organic compounds, photoconductive organic materials, inorganic compounds, etc. It is therefore an object of the invention to provide a scanning tunneling microscope having a light source to irradiate a sample to be investigated in order to increase the conductivity of the sample, through which an image of the surface structure with higher resolution is obtained.

Materials which increase their conductivity with light irradiation are listed hereunder. Among single elements, such materials are Si, P, S, Ge, As and I. Among inorganic compounds, ZnS, CdS, $As_2S_3$, PbS, $Bi_2S_3$, $Ag_2S$, $MoS_2$, HgS, $Tl_2S$, GeS, $Sb_2S_2$, ZnSe, CdSe, PbSe, $Bi_2Se_3$, ZnTe, CdTe, PbTe, $Bi_2Te_3$, $Cu_2Te$, $Ag_2Te$, HgTe, $Tl_2Te$, $Sb_2Te$, $Mo_2Te$, $W_2Te$, $U_2Te$, ZnO, PbO, HgO, $PbCrO_4$, $Cu_2O$, $PbMoO_4$, MgO, BaO, $TiO_2$, InSb, InAs, InP, GaSb, GaAs, GaP, AlSb, AlAs, AlP, $Cd_3As$, InSe, InTe, InO, $Mg_3Sb_2$, TlBr, $HgI_2$, TlI, alkali halides having F-center, $Zn_3P_2$, ZnSb, $Cd_3As_2$, $Mg_2Bi$, $Mg_2Ge$, $Mg_2Sn$. All photoconductive organic materials can produce high resolution images by the apparatus of the present invention. Such materials account for a great number and range in a wide variety. However, a short list of such materials includes: for example, polyacetylene in linear conjugated polymers; polyparaphenylensulfide in high polymer cyclic conjugate; polypyrrole composed of heterocyclics; so called PVK-TNF composed of poly-N-vinylcarbazole (PVK) and 2,4,7-trinitrofluorene (TNF) in polymer charge-transfer complexes; various aromatic compounds such as tetracene, dyes, pigments, and charge-transfer complexes in low molecular compounds; phthalocyanine which is typical of dye semiconductors such as dyes and pigments; vanadylphthalocyanine, alumiphthalocyanine chloride, galliumphthalocyanine, chloroindiumphthalocyanine chloride, etc. formed by changing the central atom of phthalocyanine; chlorophyll in biomaterial; polymethine dyes such as cyanine, merocyanine and oxonol, and squalene dye which are well known sensitizers. The above are included in p-type semiconductors. N-type semiconductive materials of this kind includes azobenzen dye, Rhodamine B which is typical of xanthene dye, and crystal-violet which is typical of triphenylmethane dye.

PREFERRED EMBODIMENTS (Embodiment 1)

Embodiments of the present invention are hereunder described with reference to the drawings.

Figure 1:
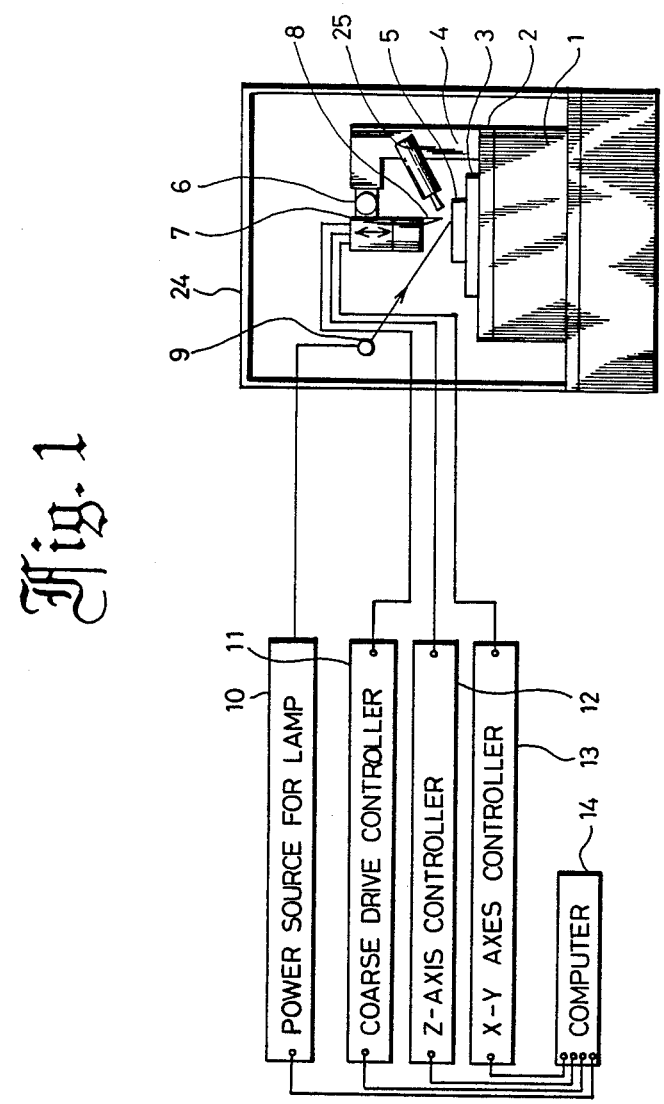
FIG. 1 is an illustration briefly showing for explanation purpose a scanning tunneling microscope apparatus according to the invention.

FIG. 1 shows a scanning tunneling microscope according to the present invention. A tunneling unit 7 is mounted on an arm 4 which is fixed to a surface plate mounted on an anti-vibration stage 1. By turning a dial 6, the tunneling unit can be moved in the vertical direction thereby enabling the coarse positioning of a probe 8 in a z-axis direction in relation with a sample 5. Coarse positioning of the probe in relation with the sample in the plane direction (along X-Y axes) is carried out through the use of an X-Y stage 3 and a coarse drive controller 11. An optical microscope 25 can be used as an aid for coarse positioning between the probe and the sample. Observation in the order of the magnitude of an atom is carried out with a lamp 9 coupled to a lamp power source. Such lamps may include a $D_2$ (deuterium) lamp, a Xe lamp, a halogen lamp, a tungsten lamp, and a He laser. One of those lamps is fixedly provided, or so provided as to be changed with another lamp. Scanning across the sample surface in the plane direction is carried out through the control of three-dimension piezoelectric elements incorporated in the tunneling unit by the x-y axes controller 13. A constant voltage in a range between 1 and 100 mV is applied between the sample and the probe thereby defining a current flowing therebetween in a range between 0.01 and 100 nA, and the probe is adjusted by the z-axis controller so that the current is maintained constant. A computer 14 controls the lamp power source, a coarse movement controller, the Z-axis controller and the X-Y axes controller. Data obtained are processed by the computer and displayed in a three-dimensional representation. All apparatus except for the power source, controllers and the computer are installed in a shield box 24.

By using the apparatus described hereinabove, the following photoconductive single elements and inorganic compounds are investigated.

Si, P, S, Ge, As, I, ZnS, CdS, As S, PbS, $Bi_2S_3$, ZnSe CdSe, PbSe, $Bi_2Se_3$, ZnTe, CdTe, PbTe, $Bi_3Te_2$, $Cu_2Te$, $Ag_2Te$, HgTe, $Tl_2Te$, $Sb_2Te$, $Mo_2Te$, $W_2Te$, $U_2Te$, ZnO, PbO, HgO, $PbCrO_4$, $Cu_2O$, $PbMoO_4$, MgO, BaO, $TiO_2$, InSb, InAs, InP, GaSb, GaAs, GaP, AlSb, AlAs, AlP, $Cd_3As$, InSe, InTe, InO, $Mg_3Sb_2$, TlBr, $HgI_2$, TlI, alkali halides having F-center, $Zn_3P_2$, ZnSb, $Cd_3As_2$, $Mg_2Bi$, $Mg_2Ge$, and $Mg_2Sn$. All the abovementioned materials are observed through the use of the scanning tunneling microscope according to the present invention As a result, atomic images could be obtained with higher resolution in comparison with images obtained without light irradiation. Here, an example of observation using CdS is described. A single crystal of CdS is fixed on the X-Y stage shown in FIG. 1. Coarse adjustment of the CdS single crystal in the plane direction is carried out through the use of the X-Y stage and the coarse movement controller, in which the probe is closed in near contact with the CdS while observing through the optical microscope. Then the lamp is turned on to irradiate the CdS, the z-axis controller and the X-Y axes controller are controlled by the computer when the surface condition is observed on the order of the magnitude of an atom. If there is no light irradiation provided, tunneling currents do not flow in sufficient quantity, so that only images of low resolution could be obtained. Under light irradiation, tunneling currents, at a fixed voltage level, flow several tens times more than they do without light irradiation, thus atomic images can be investigated far more sensitively, and the obtained atomic images have a remarkably higher resolution.

Further, organic compounds are observed by the scanning tunneling microscope of the invention under light irradiation on the order of the magnitude of an atom. Photoconductive organic compounds subjected to this investigation range in a wide variety. A list of investigated materials includes, polyacetylene in linear conjugated polymers; polyparaphenylensulfide in ring conjugated polymers; polypyrrole composed of heterocyclics; so called PVK-TNF composed of poly-N-vinylcarbazole (PVK) and 2,4,7-trinitrofluorene (TNF) in polymer charge-transfer complexes; various aromatic compounds such as tetracene, dyes, pigments, and charge-transfer complexes in low polymer materials; phthalocyanine which is typical of dye semiconductors such as dyes and pigments; vanadylphthalocyanine, alumiphthalocyanine chloride, galliumphthalocyanine, chloroindiumphthalocyanine chloride, etc. formed by changing the central atom of phthalocyanine; chlorophyll in biomaterial; polymethine dyes such as cyanine, merocyanine and oxonol, and squalene dye which are well known sensitizers. The above are included in p-type semiconductors. N-type semiconductive materials of this kind includes azobenzen dye, and crystalviolet which is typical of triphenylmethane dye. Typical photoconductive organic compounds as above mentioned have been investigated. The surface conditions in all the cases were observed under light irradiation, and as a result, the highly sensitive observation of atomic images has become possible.

(Embodiment 2)

Figure 2:
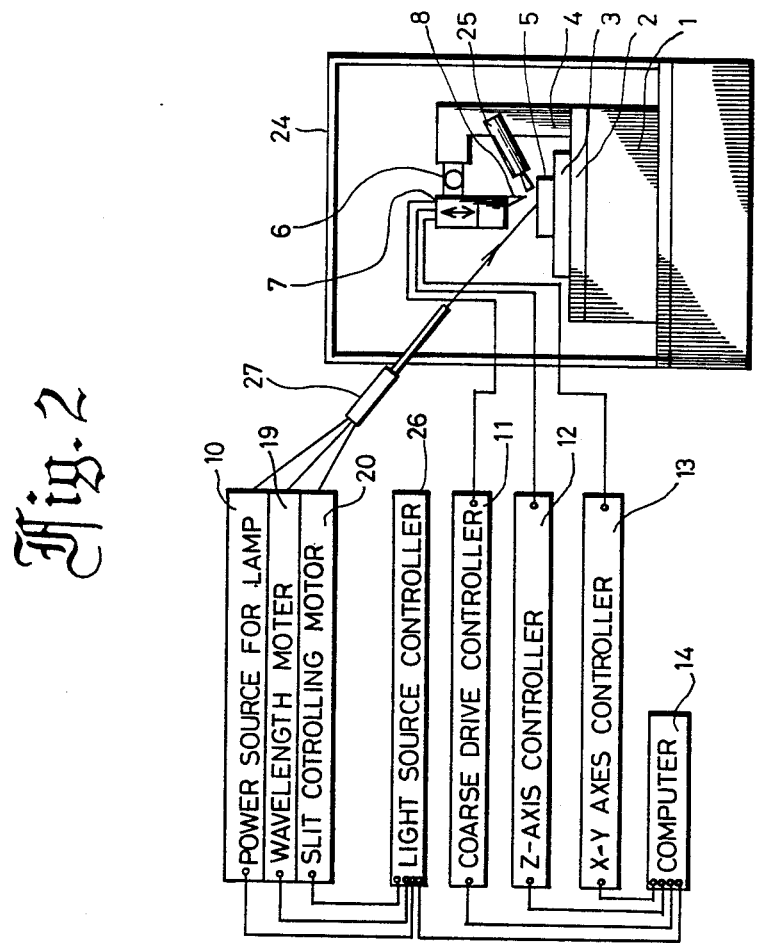
FIG. 2 is an illustration briefly showing for explanation purpose a scanning tunneling microscope apparatus which is capable of scanning with a wavelength.
Figure 3:
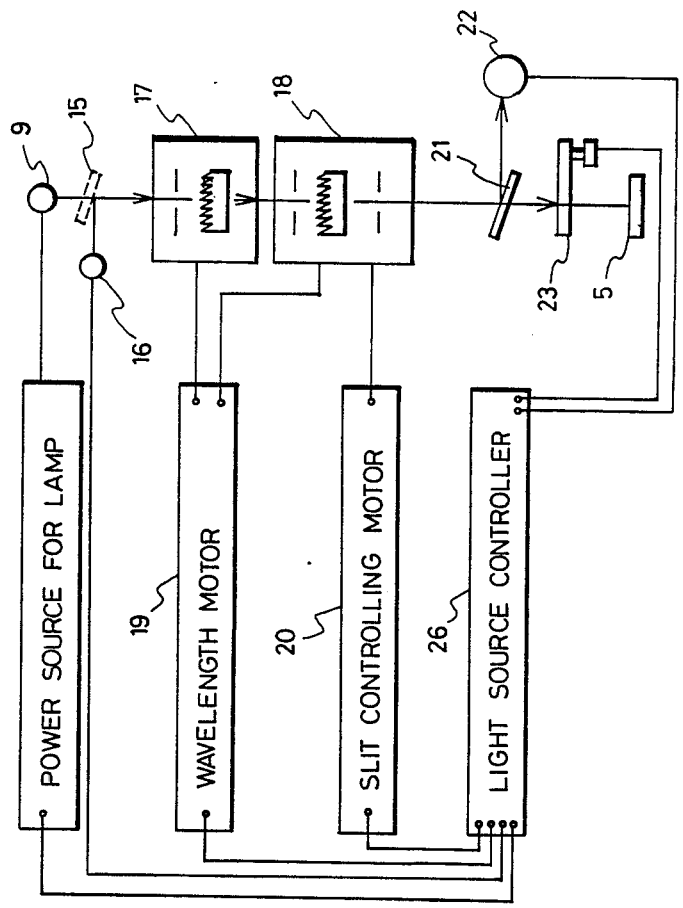
FIG. 3 shows a light source and its control system in the apparatus shown in FIG. 2.

FIG. 2 shows a scanning tunneling microscope according to the invention which is capable of scanning with light of a chosen wavelength. It is the same apparatus as the one in Embodiment 1 except for the light source 27 and its control system. One example of the light source and its control system is briefly shown in FIG. 3. Light emerged from a lamp 9 transmit through a fore-monochromator 17 and a main-monochromator 18, and irradiate a sample 5. At the initial setting stage, an insertion mirror 15 is inserted in the optical-pass so that light from a Hg lamp 16 for correction enters into the monochromators. Based on the emission lines of the Hg lamp, correction of wavelength and band-pass is automatically carried out with the aid of a computer which is not shown in the figure. A part of the light emitted from the monochromators is directed by a beam splitter 21 toward a monitoring detector 22. When required, a shutter is placed between the monochromators and a sample in response to the command from a light source controller 26. The light source controller operates a lamp power source, the monitoring detector and driving parts: namely, wavelength motors 19 for adjusting the monochromators to obtain a desired wavelength, a slit controlling motor 20, the insertion mirror, and a rotary solenoid for shutter 23. The light source controller is connected to a computer 14 of the scanning tunneling microscope. Surface structures of all the materials listed in the embodiment 1 can be investigated under different wavelengths. It is possible by this apparatus to observe the atomic configurations of the surface which are wavelength dependent.

According to the present invention, photoconductive materials which generate carriers, and therefore increase conductivity or generate electromotive forces under light irradiation are observed under light irradiation. By this apparatus, it has become possible to obtain images of surface structures of materials, which are conventionally difficult to investigate or only obtained in poor resolution.

We claim:

1. A tunneling scanning microscope comprising: a probe having a fine conductive tip; means for positioning the tip of said probe sufficiently close to a sample surface to be investigated so that tunneling current flows; means for scanning across said sample surface with the tip of said probe; means for automatically controlling a distance between the tip of said probe and said sample surface during scanning in response to measured tunnel current; means for graphically displaying the spatial coordinates of said sample surface and producing an image of the configuration of said sample surface; and a light source for irradiating said sample surface.

2. A tunneling scanning microscope defined in claim 1, further comprising means for producing light having substantially a single wavelength for irradiating said sample surface.

* * * * *